(12) United States Patent
Wang et al.

(10) Patent No.: US 12,346,012 B2
(45) Date of Patent: Jul. 1, 2025

(54) ELECTRICALLY-CONTROLLED UPPER HANDLE AND IMAGING ACCESSORY

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 81 days.

(21) Appl. No.: 18/447,500

(22) Filed: Aug. 10, 2023

(65) Prior Publication Data

US 2025/0053071 A1 Feb. 13, 2025

(51) Int. Cl.
*G03B 17/56* (2021.01)
(52) U.S. Cl.
CPC ................. *G03B 17/563* (2013.01)
(58) Field of Classification Search
CPC ............................. G03B 17/563; H04N 23/66
See application file for complete search history.

(56) References Cited

U.S. PATENT DOCUMENTS

| | | | |
|---|---|---|---|
| 8,743,277 B2* | 6/2014 | Matsuzawa ............ | G03B 17/02 348/374 |
| 2011/0102669 A1* | 5/2011 | Yano ...................... | G03B 17/18 348/376 |
| 2012/0162503 A1* | 6/2012 | Yano .................... | G03B 17/566 348/E5.026 |

* cited by examiner

*Primary Examiner* — Noam Reisner
(74) *Attorney, Agent, or Firm* — Westbridge IP LLC (57) ABSTRACT

Disclosed are an electrically-controlled upper handle and an imaging accessory. The electrically-controlled upper handle is configured to be mounted on the imaging device and includes a handle portion, a mounting portion and an electrically-controlled mechanism. The mounting portion is connected to the handle portion and is configured to be mounted on the imaging device. The electrically-controlled mechanism is arranged on the handle portion, is configured to be electrically connected to the imaging device, and determines the type of the imaging device according to a connection signal of the electrically-controlled mechanism and the imaging device so as to control electrically-controlled work of the imaging device.

8 Claims, 9 Drawing Sheets

FIG. 8

ELECTRICALLY-CONTROLLED UPPER HANDLE AND IMAGING ACCESSORY

TECHNICAL FIELD

The present application relates to the technical field of photography, in particular, to an electrically-controlled upper handle for imaging device and an imaging accessory having the same.

BACKGROUND

For ease of lifting an imaging device, a handle for the imaging device is usually mounted on the imaging device in use, and is also electrically connected to the imaging device by a data cable, thereby controlling electrically-controlled work of the imaging device by the handle, such as recording, imaging, etc.

However, existing handles are generally provided with a diverter switch, when the handle is electrically connected to different types of imaging devices, it is necessary to switch the control circuit by manually flipping the diverter switch, so that different types of imaging devices can be controlled for recording, taking photos and the like. However, the above operation is complex and inconvenient.

SUMMARY

In order to overcome the above-mentioned problems existing in the related art, the main object of the present application is to provide a simple and convenient electrically-controlled upper handle in controlling the imaging device for electrically-controlled work.

In order to achieve the above object, the present application adopts the following technical solutions:

The present application provides an electrically-controlled upper handle mounted on an imaging device, including:

a handle portion;

a mounting portion configured to be connected to the handle portion and mounted on the imaging device; and an electrically-controlled mechanism provided on the handle portion, the electrically-controlled mechanism being electrically connected to the imaging device to control electrically-controlled work of the imaging device.

In an embodiment, the electrically-controlled mechanism includes a housing, a press assembly and a circuit board. The handle portion is provided with a first mounting groove, and the housing is provided in the first mounting groove, forming a mounting cavity with the first mounting groove. The circuit board is provided in the mounting cavity, and the press assembly passes through the housing and is connected to the circuit board.

In an embodiment, the circuit board includes a connection port, the handle portion is provided with an interface through hole, and the interface through hole is communicated with the connection port.

In an embodiment, the housing is provided with a key mounting hole, the circuit board includes a switch start key, and the press assembly includes a first elastic member and a key. The key is inserted into the key mounting hole, one end of the first elastic member is sleeved into the switch start key, and the other end of the first elastic member passes through the key.

In an embodiment, a locking mechanism is further included. The locking mechanism is provided in the mounting portion and is combined with the mounting portion to form a cold shoe opening.

The locking mechanism includes a hand screw cap, a threaded rod, a gasket unit, a second elastic member and a stop block. The threaded rod is passed through the mounting portion, an upper end of the threaded rod is screwed to the hand screw cap, and a lower end of the threaded rod is connected to the stop block. The gasket unit is sleeved to one end of the threaded rod near the hand screw cap, and the second elastic member is sleeved to one end of the threaded rod near the stop block.

In an embodiment, the gasket unit includes a first gasket, a second gasket and a third gasket, and the first gasket, the second gasket and the third gasket are stacked sequentially from top to bottom. The second gasket includes a gasket body and a ball, and the ball is arranged in the gasket body along a circumferential direction of the gasket body.

In an embodiment, the mounting portion is provided with a limit groove, and when the electronically-controlled upper handle is connected to the imaging device by a data cable, the limit groove is configured to limit the data cable; and/or, the handle portion is also provided with at least one threaded hole, and the threaded hole is configured to be externally connected with an external imaging accessory.

Correspondingly, the present application also provides an imaging accessory including the above-mentioned electronically-controlled upper handle.

Compared with the related art, the electronically-controlled upper handle of the present application includes a handle portion, a mounting portion and an electrically-controlled mechanism. The mounting portion is connected to the handle portion, and is installed on the imaging device; the electrically-controlled mechanism is arranged on the handle portion, and is electrically connect with the imaging device to control the electric control operation thereof. The electrically-controlled mechanism can control on/off of the imaging device, or can automatically switch the electric control process that the control circuit controls the imaging device according to type of the imaging device, which depends on the design and definition for the circuit board's circuit according to usage requirements. The electronically-controlled upper handle of the present application is provided with an electrically-controlled mechanism, through which the type of the imaging device connected to it is directly determined, and the control circuit is automatically switched according to the type of the imaging device to control the electronic control operation of the imaging device. There is no need to manually switch the control circuit by switching switch, therefore, the electronically-controlled upper handle of the present application is simpler and more convenient in operation when controlling the work of the imaging device.

DETAILED DESCRIPTION OF THE EMBODIMENTS

In order to make the purposes, technical solutions and advantages of the present application clearer, the present application will be further described in detail below in conjunction with the accompanying drawings and embodiments. It should be understood that the specific embodiments described here are only used to explain the present application, and are not intended to limit the present application.

In the description of the present application, unless otherwise clearly specified and limited, the terms "first" and "second" are only used for the purpose of description, and cannot be understood as indicating or implying relative importance; unless otherwise specified or stated, the term "a plurality of" refers to two or more; terms "connected", "fixed" and the like should be understood in a broad sense, for example, "connected" can be fixedly connected, detachably connected, or integrally connected, or electrically connected; either directly connected or indirectly connected by an intermediary. Those ordinary skill in the art can understand the specific meanings of the above terms in the present invention according to specific situations.

In the description of the present specification, it should be understood that the orientation words such as "up" and "down" described in the embodiments of the present application are described from the perspective shown in the drawings, and should not be interpreted as a limit to the embodiments of the present application.

Furthermore, in this context, it also needs to be understood that when it is mentioned that an element is connected "on" or "under" another element, it not only can be directly connected "on" or "under" another element, but also can be indirectly connected "on" or "under" another element by an intermediate member.

As shown in FIGS. 1A to 3, the present application provides an electrically-controlled upper handle. The electrically-controlled upper handle includes a handle portion 1, a mounting portion 2 and an electrically-controlled mechanism 3. The handle portion 1 has a first end 11 and a second end 12, the mounting portion 2 is connected to the first end 11 of the handle portion 1, the mounting portion 2 is configured to be connected with an imaging device, and the handle portion 1 is configured to be held by user, thereby lifting the whole imaging device, changing the shooting angle, or for placing.

The electrically-controlled mechanism 3 is arranged at the first end 11 of the handle portion 1. When the imaging device is controlled by the electrically-controlled upper handle, the electrically-controlled mechanism 3 is electrically connected to the imaging device by a data cable, and then the electrically-controlled mechanism 3 controls on/off of the imaging device. Alternatively, according to the connection signal of the imaging device electrically connected with the electrically-controlled mechanism 3, the electrically-controlled mechanism 3 determines the type of the imaging device, and automatically switches the control circuit integrated on the circuit board according to the type of the imaging device, thereby controlling the electrically-controlled work such as recording, taking pictures or the like of the imaging device.

By the electrically-controlled mechanism 3, the present application can directly determine the type of the imaging device connected to the electrically-controlled mechanism 3, and automatically switch the control circuit according to the type of the imaging device to control the electrically-controlled work of the imaging device, without manually switching the control circuit by a switch, as a result, the electrically-controlled upper handle of the present application is simple and convenient to operate when controlling the electrically-controlled work of the imaging device.

Figure 4:
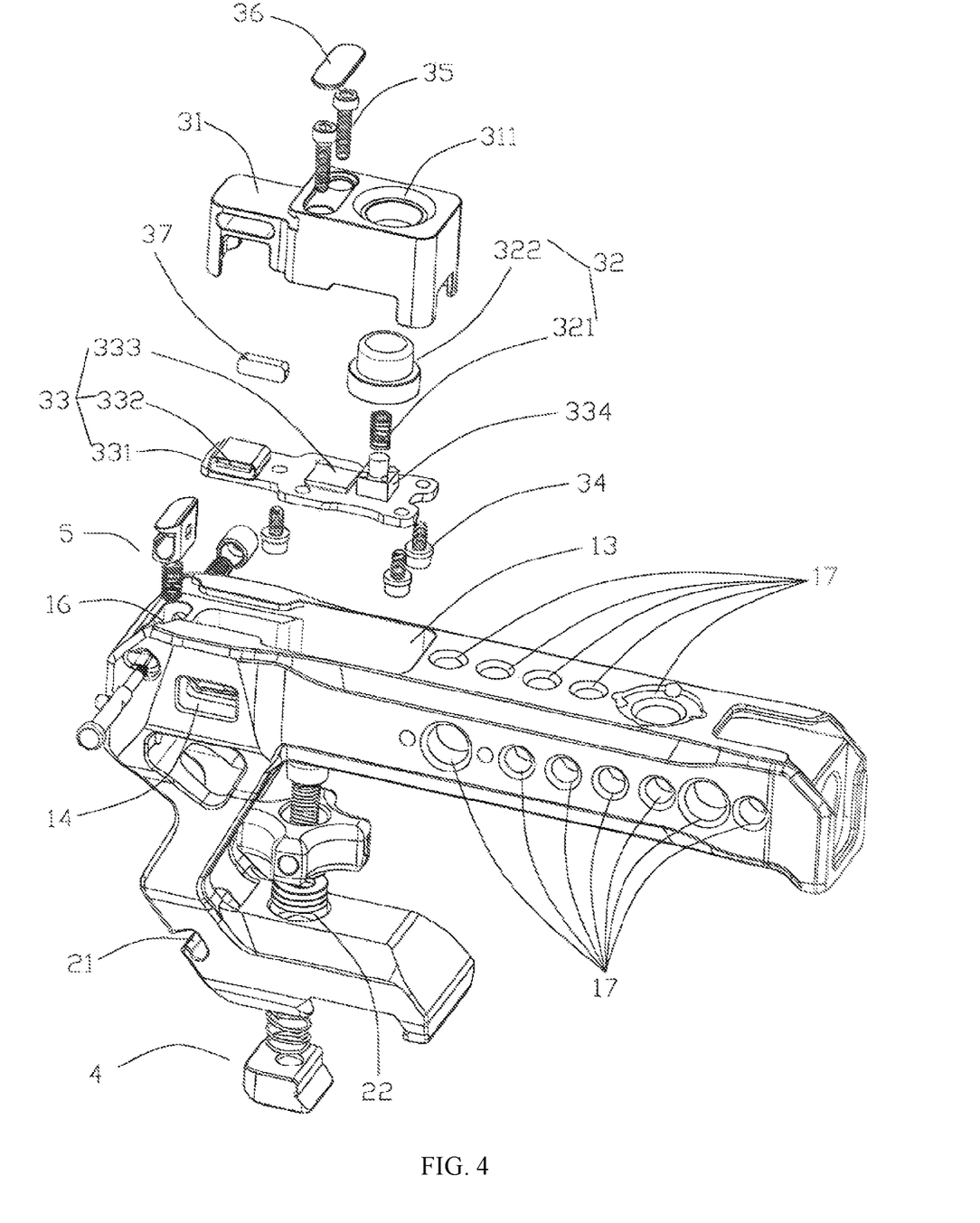
FIG. 4 is a three-dimensional exploded diagram of the electrically-controlled upper handle in FIG. 1A.
Figure 5:
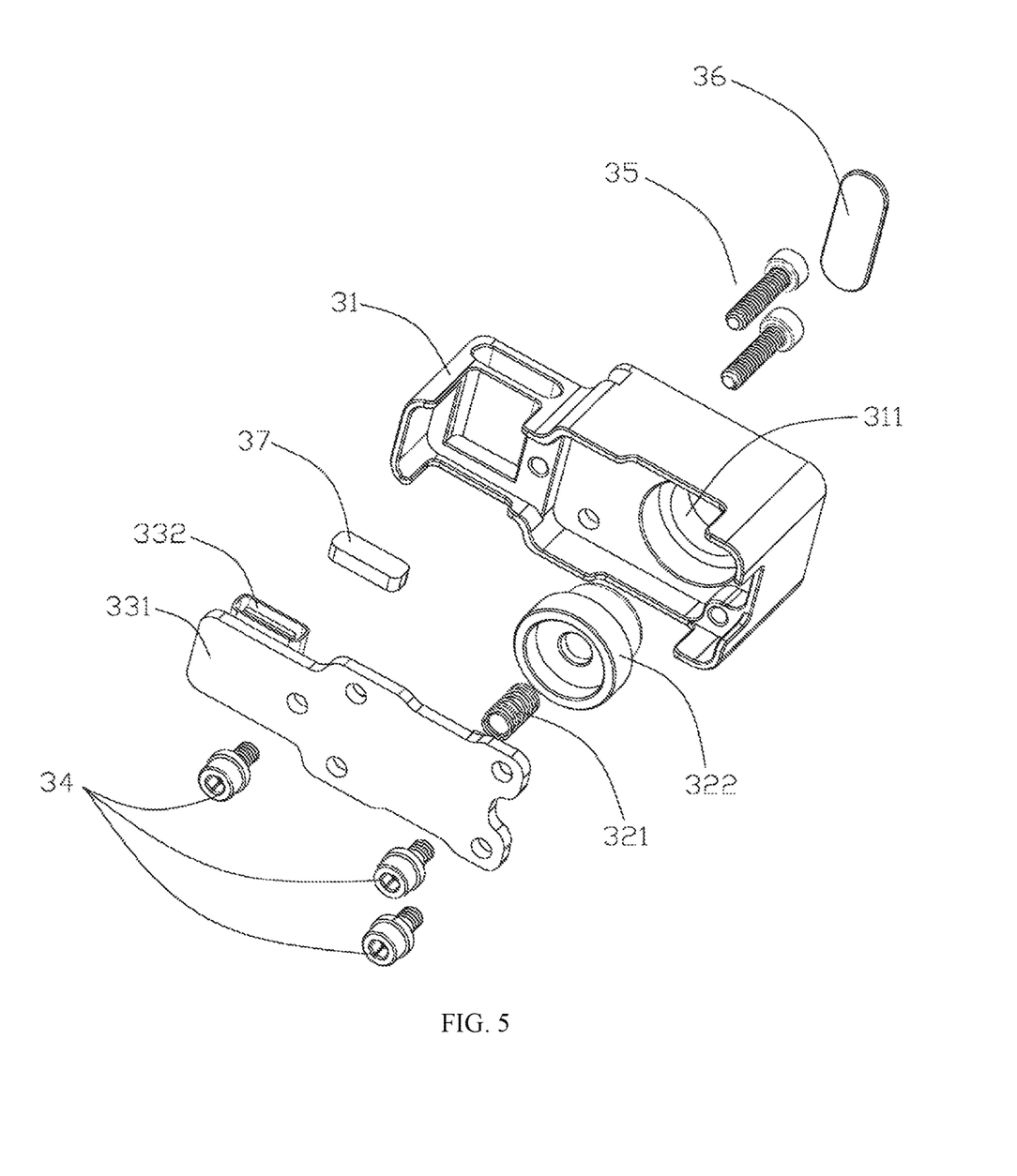
FIG. 5 is a three-dimensional exploded diagram of an electrically-controlled mechanism in FIG. 1A.

As shown in FIGS. 4 and 5, the first end 11 of the handle portion 1 is provided with a first mounting groove 13 and an interface through hole 14, and the electrically-controlled mechanism 3 includes a housing 31, a pressing assembly 32, a circuit board 33, a first screw 34, a second screw 35, a first cover 36 and a second cover 37. The housing 31 is provided with a key mounting hole 311, the pressing assembly 32 includes a first elastic member 321 and a key 322, and the circuit board 33 includes a substrate 331, a connection port, a chip 333, a switch start key 334 and a peripheral circuit. The wires connected with the connection port can be High-Definition Multimedia Interface (HDMI) wires, Universal Serial Bus (USB) wires, Type-C wires or the like, which are not limited again. In an embodiment, the connection port is a USB interface 332. The USB interface 332, the chip 333, the switch start key 334 and the peripheral circuit are arranged on the substrate 331 respectively, the USB interface 332 is electrically connected to the peripheral circuit and the chip 333 respectively, and the switch start key 334 is configured to control the work of the circuit board 33. During assembly, the circuit board 33 is fixed in the first mounting groove 13 by the first screw 34, so that the USB interface 332 is connected to the interface through hole 14. One of the first elastic member 321 is sleeved on the switch start key 334, and the other end of the first elastic member 321 is passed through the key 322. The housing 31 is fixed in the first mounting groove 13 by the second screw 35, and the housing 31 and the first mounting groove 13 form a mounting cavity. The circuit board 33 is located in the mounting cavity, and the key 322 is passed through the key mounting hole 311. The first cover 36 is covered on the top of the second screw 35, and the second cover 37 is configured to cover the interface through hole 14.

In another embodiment, during assembly, the control circuit board 33 can also be fixed on the bottom surface of the housing 31, and then the housing 31 is placed into the first mounting groove 13 together with the control circuit board 33. In further embodiment, the first elastic member 321 may be omitted. The key 322 is pressed to contact the switch start key 334, and the key 322 is released to be pushed up by the switch start key 334.

The present application adopts a universal USB interface 332. When replacing the imaging device, only the data cable connector needs to be replaced. The top of the first screw 34 is covered with the first cover 36, and the interface through hole 14 is covered with the second cover 37, making the appearance of the product more beautiful.

In order to limit the data cable, the mounting portion 2 is provided with a limit groove 21. When the electrically-controlled upper handle is electrically connected to the imaging device, the data cable is limited through the limit groove 21. In the related art, a limit hole is provided on the handle to limit the data cable. However, when connecting, the data cable needs to pass through the limit hole, which is inconvenient for disassembly and mounting. In the present application, by providing the limit groove 21, the position limiting of the data cable can be realized, and the disassembly and installation are convenient.

Figure 6:
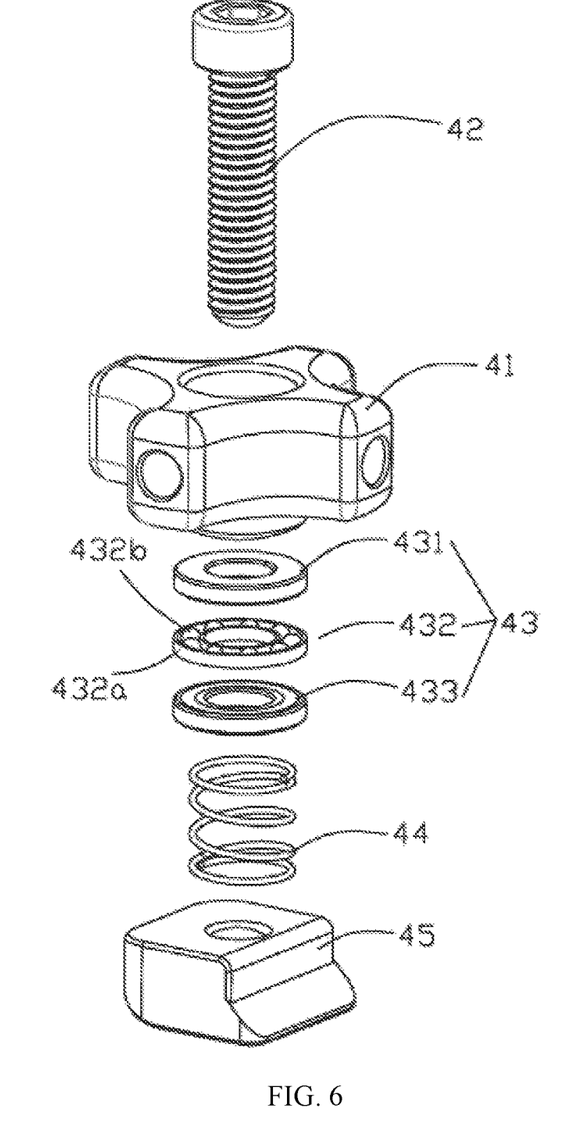
FIG. 6 is a three-dimensional exploded diagram of a locking mechanism in FIG. 1A.

As shown in FIGS. 4 and 6, the electrically-controlled upper handle further includes a locking mechanism 4. The locking mechanism 4 is arranged on the mounting portion 2, and is combined with the mounting portion 2 to form a cold shoe opening 6. The cold shoe opening 6 is configured to adapt to the stopper on the imaging device, thereby enabling the mounting portion 2 to be connected with the imaging device. The user can lift the entire imaging device by carrying the handle portion 1.

In an embodiment, the upper of the mounting portion 2 is provided with a third mounting groove 22, and the lower of the mounting portion 2 is provided with a fourth mounting groove, the third mounting groove 22 being connected to the fourth mounting groove. The locking mechanism 4 includes a hand screw cap 41, a threaded rod 42, a gasket unit 43, a second elastic member 44 and a stop block 45. The gasket unit 43 includes a first gasket 431, a second gasket 432 and a third gasket 433, and the first gasket 431, the second gasket 432 and the third gasket 433 are stacked sequentially from top to bottom. The second gasket 432 includes a gasket body 432a and a plurality of balls 432b, and the balls 432b are arranged in the gasket body 432a along the circumferential direction of the gasket body 432a. When assembling, the gasket unit 43 is disposed in the third mounting groove 22, the second elastic member 44 is disposed in the fourth mounting groove, and the threaded rod 42 is passed through the gasket unit 43 and the second elastic member 44 in sequence from top to bottom. The gasket unit 43 is sleeved on the upper end of the threaded rod 42, and the second elastic member 44 is sleeved on the lower end of the threaded rod 42. The hand screw cap 41 is screwed to the upper end of the threaded rod 42, and the stop block 45 is screwed to the lower end of the threaded rod 42. One end of the second elastic member 44 is connected to the inner wall of the fourth mounting groove, and the other end of the second elastic member 44 is connected to the stop block 45. As shown in FIG. 6, the balls around the gasket body 432a makes it easier for the threaded rod 42 to rotate.

Figure 7:
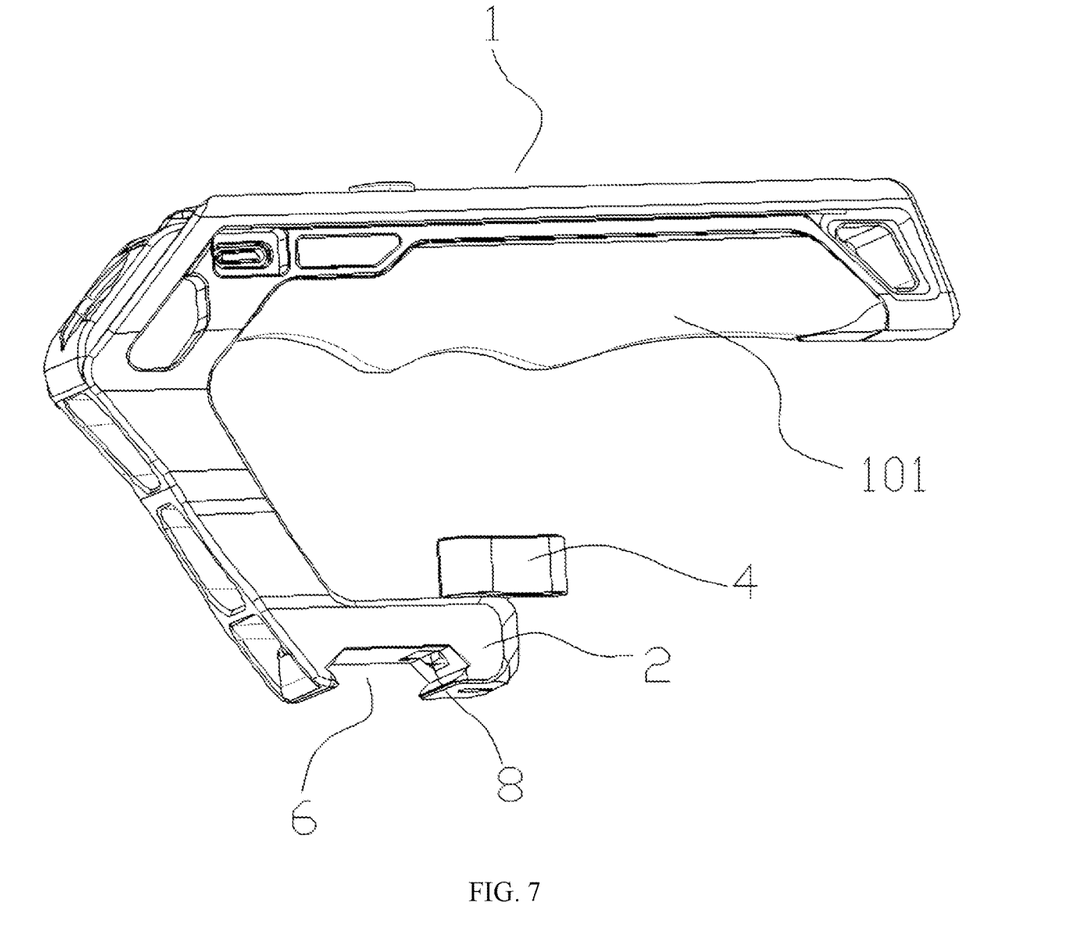
FIG. 7 is a front schematic diagram of the electrically-controlled upper handle in FIG. 1B.
Figure 8:
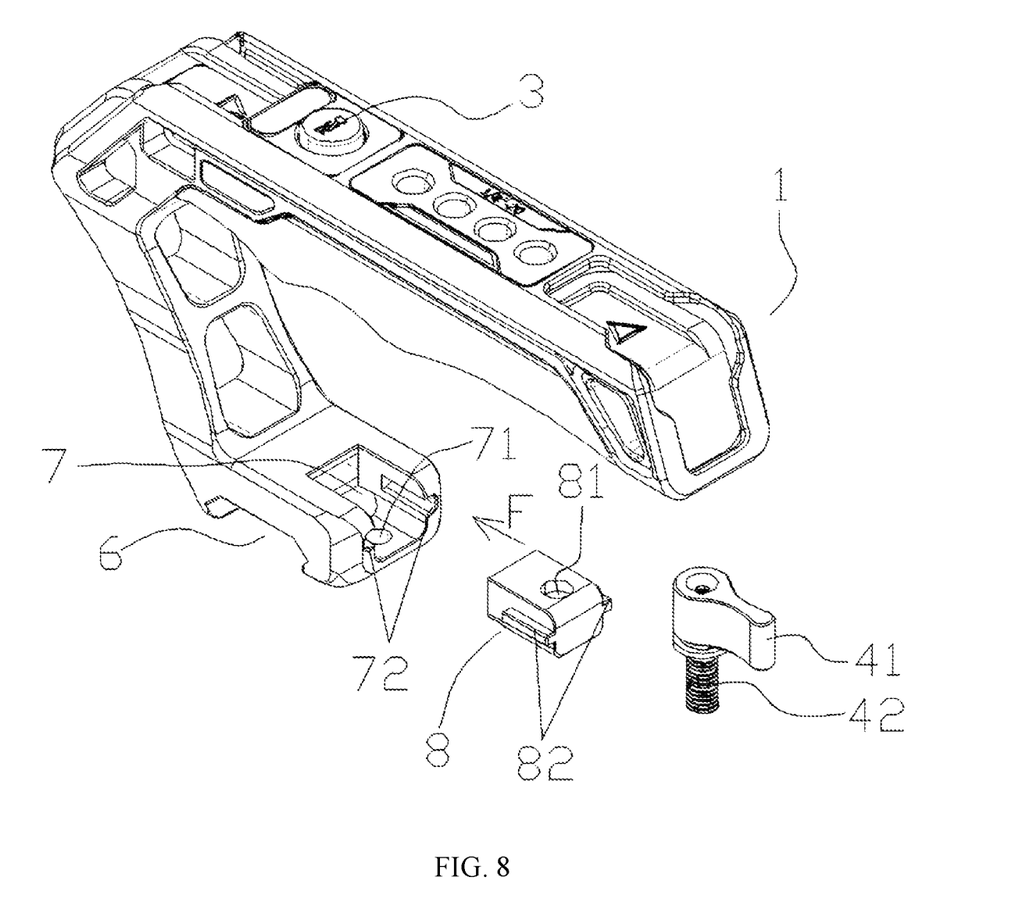
FIG. 8 is a three-dimensional exploded diagram of the electrically-controlled upper handle in FIG. 1B.

In addition, the present application also provides another embodiment. As shown in FIGS. 7 and 8, in the embodiment, the locking mechanism 4 includes a hand screw cap 41 and a threaded rod 42. The mounting portion 2 is provided with a receiving groove 7, and the bottom surface of the receiving groove 7 is partially connected to the cold shoe opening 6. The lock block 8 is slidably assembled in the receiving groove 7, and a threaded hole 71 is provided on the bottom surface of the receiving groove 7. The lock block 8 is provided with a through hole 81, and the through hole 81 of the lock block 8 is aligned with the threaded hole 71 on the bottom surface of the receiving groove 7 when the lock block 8 is assembled in the receiving groove 7. The threaded rod 42 of the locking mechanism 4 passes through the through hole 81 of the lock block 8 and then is screwed to the threaded hole 71 on the bottom surface of the receiving groove 7. When tightening the hand screw cap 41, which drives the threaded rod 42 to screw into the threaded hole 72, so that the hand screw cap 41 contacts against the lock block 8, and the lock block 8 is pressed onto the bottom surface of the receiving groove 7. Due to the local position of the bottom surface of the receiving groove 7 being connected to the cold shoe groove 6, after the lock block 8 is pressed down, the position of the lock block 8 partially contacts against the limit member on the imaging device located inside the cold shoe opening 6, thereby fixing the limit member on the imaging device inside the cold shoe groove 6.

In some embodiments, as shown in FIG. 8, the opening on the side of the receiving groove 7 allows the lock block 8 to slide in along the F direction. The side wall of the receiving groove 7 is further provided with a guide slide slot 72, and the side wall of the lock block 8 is provided with a guide block 82 that matches the guide slide slot 72. The width of the guide slide slot 72 is greater than the width of the guide block 82. Therefore, when the lock block 8 slides into the receiving groove 7 along the F direction, the guide block 82 is inserted into the guide slide slot 72, and the guide block 82 and the guide slide slot 72 are in a gap fit. In this way, the lock block 8 can float in the receiving groove 7 along the gap. Before the lock block 8 is locked by the locking mechanism 4, the position of the limit member on the imaging device can be adjusted in the cold shoe opening 6. When the locking mechanism 4 is locked, that is, the hand screw cap 41 presses the lock block 8, and the lock block 8 cannot float anymore, the lock block 8 is pressed against a bottom surface of the receiving groove 7, causing the local position of the bottom surface of the lock block 8 to enter the cold shoe groove 6 and press against the limit member of the imaging device on the cold shoe opening 6, thereby preventing the limit member of the imaging device on the cold shoe opening 6 from moving. Therefore, the clamping of the limit member on the imaging device serves to fix the limit member of the imaging device on the cold shoe opening 6.

In another embodiments, the back of the handle portion 1 for fingers to grip is further provided with a silicone layer 101, and the shape of the silicone layer 101 is wavy.

Figure 1A:
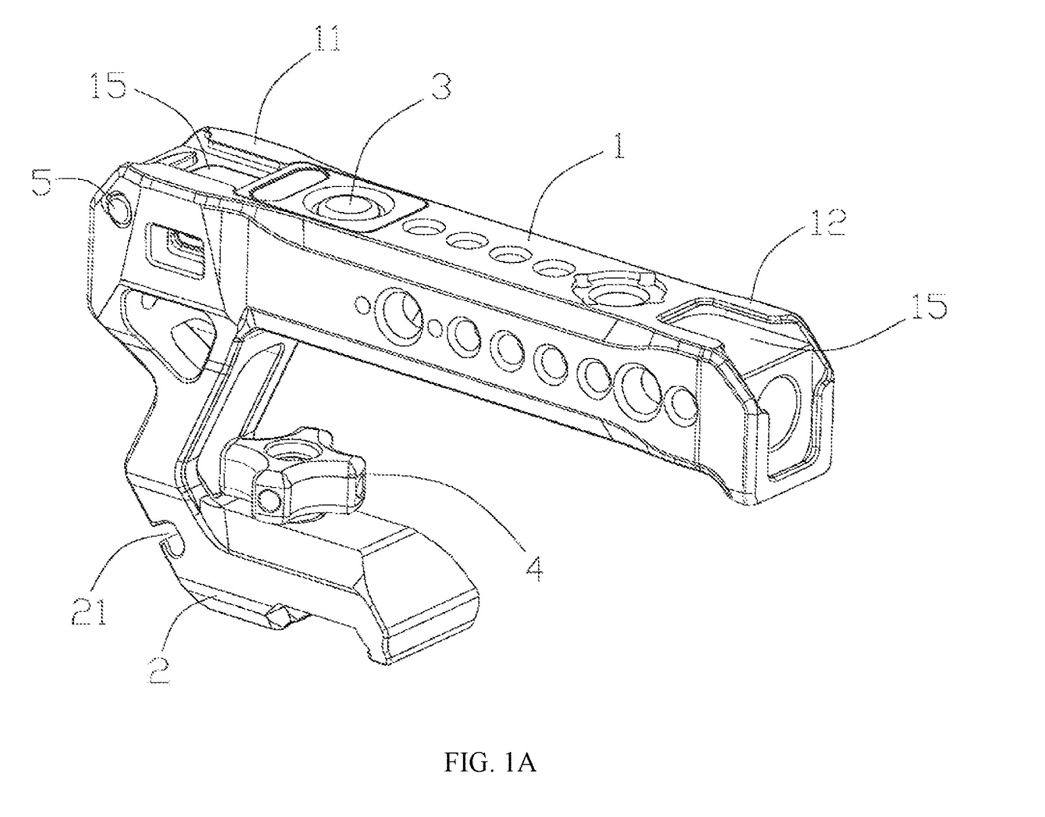
FIG. 1A is a three-dimensional assembly diagram of an electrically-controlled upper handle according to an embodiment of the present application.
Figure 1B:
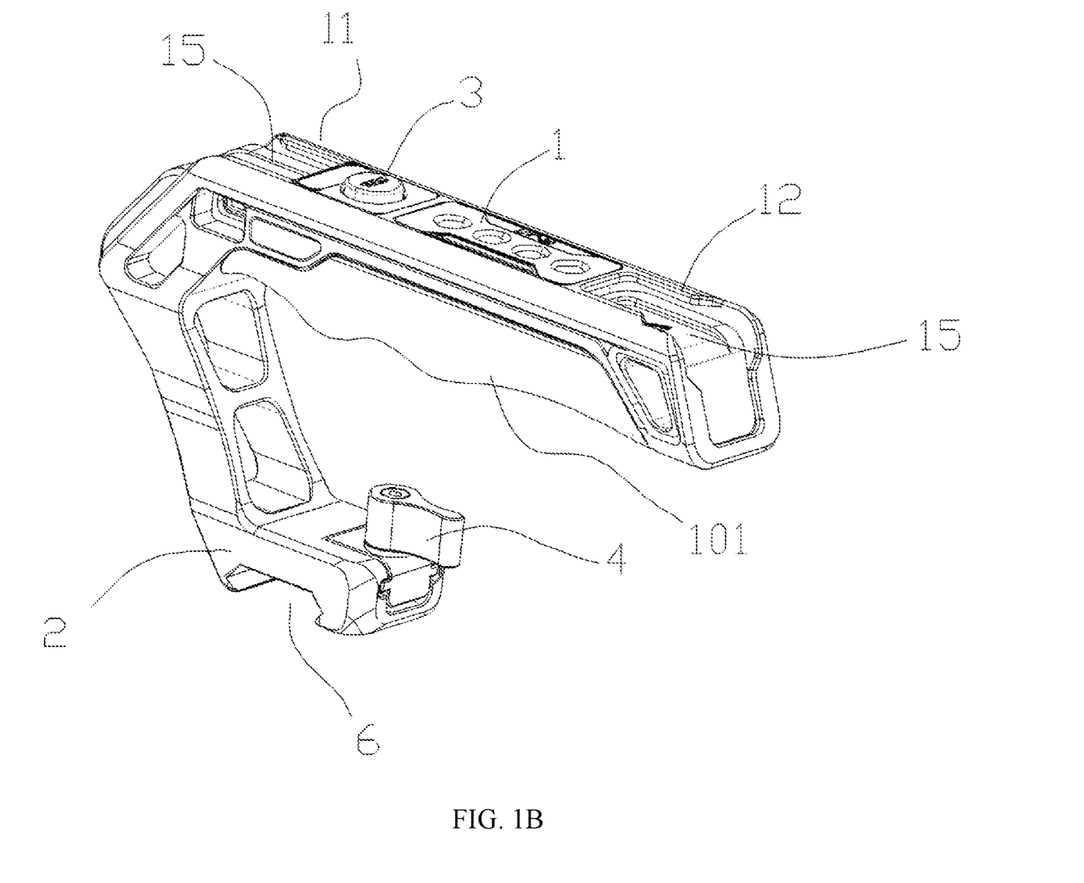
FIG. 1B is a three-dimensional assembly diagram of the electrically-controlled upper handle according to another embodiment of the present application.
Figure 2:
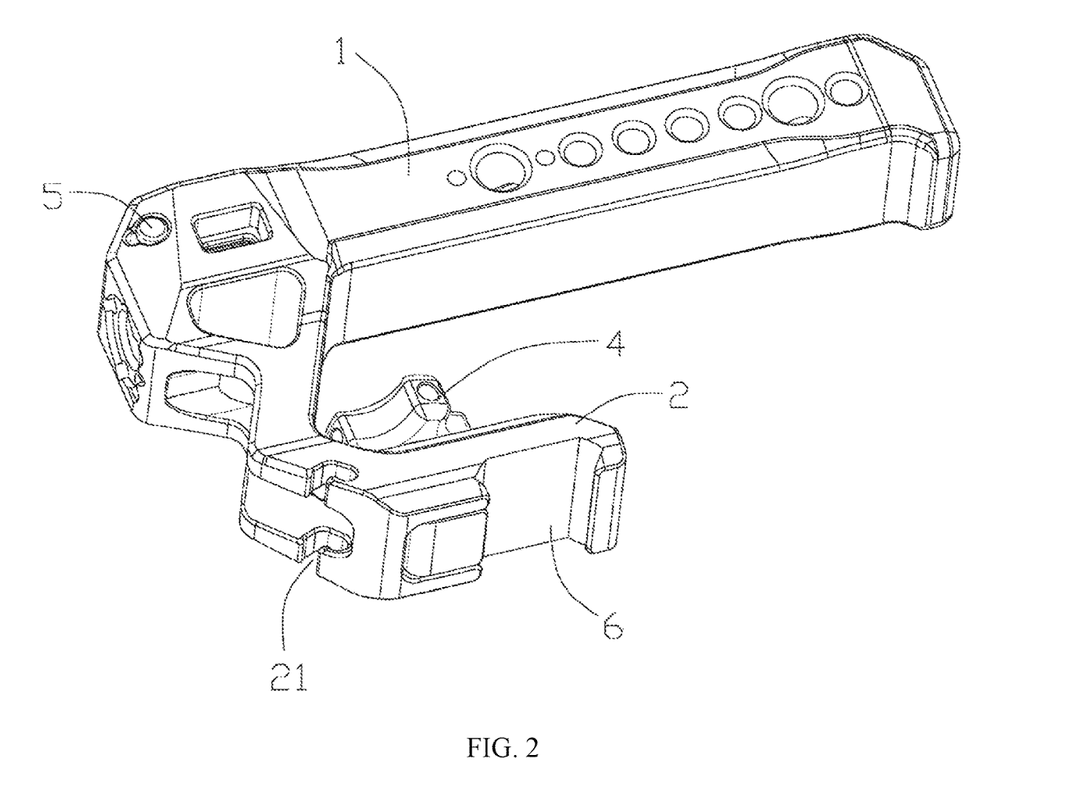
FIG. 2 is a three-dimensional assembly diagram of the electrically-controlled upper handle from another perspective in FIG. 1A.
Figure 3:
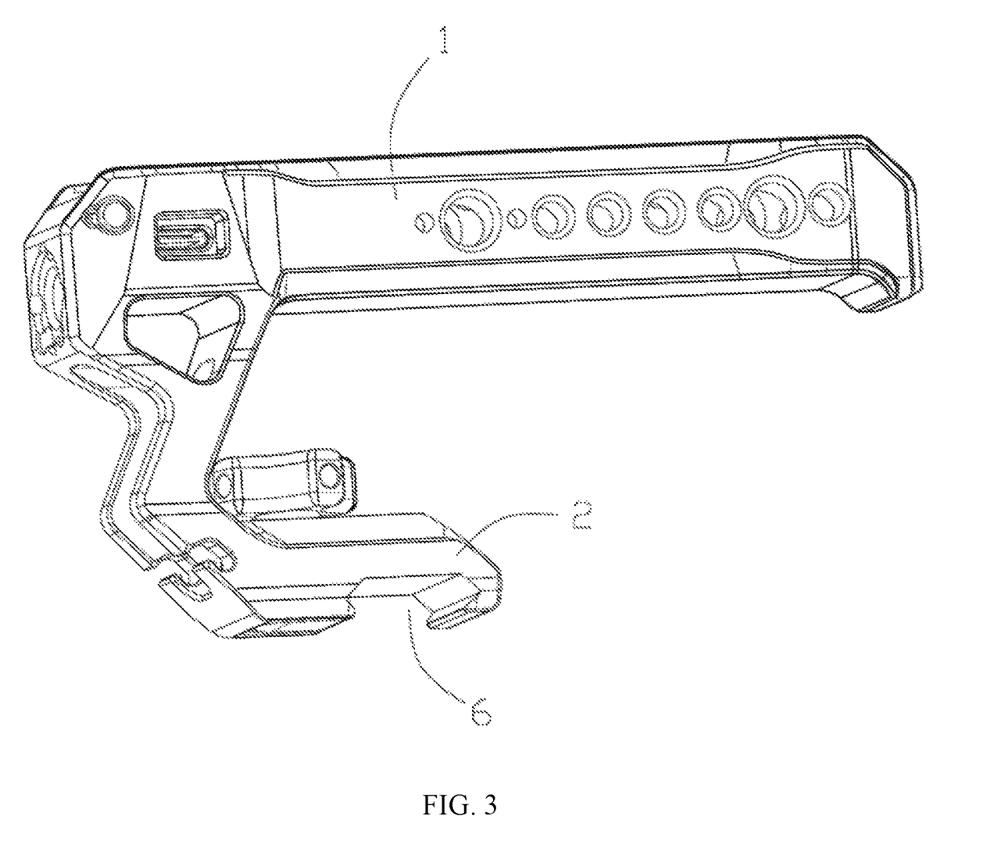
FIG. 3 is a three-dimensional assembly diagram of the electrically-controlled upper handle from another perspective in FIG. 1A.

As shown in FIGS. 1A, 4 and 7, the first end 11 and the second end 12 of the handle portion 1 are respectively provided with cold shoe openings 15, and the cold shoe openings 15 are configured to be externally connected with an external imaging accessory, such as microphones, video lights, cold shoe brackets (for external monitors), flashes and the like. The electrically-controlled upper handle further includes an anti-off mechanism 5, which is arranged on the first end 11 of the handle portion 1 and is configured to prevent the external imaging accessory connected with the cold shoe opening 15 located at the first end 11 from falling off.

In order to facilitate external connection of a plurality of imaging accessories, the side wall of the handle portion 1 is further provided with a plurality of threaded holes 17. The various imaging accessories can be conveniently connected through the threaded hole, and at the same time, it is possible to obtain the effect of reducing weigh. The size of the threaded holes is not limited, and specifications can be set according to usage needs.

In the present embodiment, the handle portion 1 and the mounting portion 2 can be integrally formed, and both the first elastic member 321 and the second elastic member 44 are springs. It can be understood that, in other embodiments, the handle portion 1 and the mounting portion 2 can also be split, connected together by bonding or other means, such as buckle connection. The first elastic member 321 and the second elastic member 44 can also be other elastic members.

During specific implementation, as shown in FIG. 4, when the electrically-controlled upper handle is connected to the imaging device, the hand screw cap 41 is loosened so that the hand screw cap 41 is located at or close to the upper end of the threaded rod 42, then the stop block 45 moves downward, the cold shoe opening 6 becomes wider, then the cold shoe opening 6 is sleeved on the stop block where the imaging device is adapted to the cold shoe opening 6, and then the hand screw cap 41 is tightened so that the hand screw cap 41 moves toward a direction away from the upper end of the threaded rod 42, the stop block 45 moves upward, the second elastic member 44 is in a compressed state or a further compressed state, and the cold shoe opening 6 is narrowed, so that the cold shoe opening 6 is clamped and fixed with the stopper of the imaging device, thereby realizing the connection between the electronically-controlled upper handle and the imaging device.

When disassembling the electrically-controlled upper handle, the hand screw cap 41 is loosened, the stopper 45 moves downward under the elastic force of the second elastic member 44, and the cold shoe opening 6 becomes wider, which is convenient for the stopper of the imaging device to detach from the cold shoe opening 6, thereby realizing the disassembly of the electrically-controlled upper handle.

In the related art, in order to be able to lock the stop block, it is necessary to use an external tool (such as a hexagonal wrench) to tighten the hand screw cap.

In the present application, by arranging the gasket unit 43 and arranging the balls on the gasket in the middle, it is only necessary to manually screw the hand screw cap without external tools when locking the stop block, and the operation is simple and convenient.

When controlling the recording of the imaging device by the electrically-controlled upper handle, take off the second cover 37, connect one end of the data cable to the USB interface 332, connect the other end of the data cable to the imaging device, press the key 322, the circuit board 33 determines the type of the imaging device according to the connection signal of the imaging device connected with it, and controls the imaging device to start recording. When the recording is completed, press the key 322 again, and the circuit board 33 controls the imaging device to end the recording.

Correspondingly, the present application further provides an imaging accessory. The imaging accessory includes the above-mentioned electrically-controlled upper handle. In an embodiment, the electrically-controlled upper handle can be connected and fixed to the imaging accessory by the mounting portion, or be connected to the imaging accessory by the threaded holes. The imaging accessory can be a small accessory, a large accessory or a combination of various accessories, which are not limited here.

The above is only a preferred embodiment of the present application, but the scope of protection of the present application is not limited thereto. Changes or alternatives that can easily be conceived by those skilled familiar with the technical field within the technical scope disclosed in the present application should be covered within the scope of the present application. Therefore, the scope of the present application should be based on the scope of the claims.

What is claimed is:

1. An electrically-controlled upper handle, used to be mounted on an imaging device, comprising:
    a handle portion;
    a mounting portion configured to be connected to the handle portion and mounted on the imaging device; and
    an electrically-controlled mechanism provided on the handle portion, the electrically-controlled mechanism being electrically connected to the imaging device to control electrically-controlled work of the imaging device,
    the electrically-controlled upper handle further comprises a locking mechanism provided in the mounting portion and combined with the mounting portion to form a cold shoe opening,
    wherein the locking mechanism comprises a hand screw cap, a threaded rod, a gasket unit, a second elastic member and a stop block, the threaded rod is passed through the mounting portion, an upper end of the threaded rod is screwed to the hand screw cap, a lower end of the threaded rod is connected to the stop block, the gasket unit is sleeved to one end of the threaded rod near the hand screw cap, and the second elastic member is sleeved to one end of the threaded rod near the stop block.

2. The electrically-controlled upper handle according to claim 1, wherein:
    the electrically-controlled mechanism comprises a housing, a press assembly and a circuit board,
    the handle portion is provided with a first mounting groove,
    the housing is provided in the first mounting groove, forming a mounting cavity with the first mounting groove,
    the circuit board is provided in the mounting cavity, and
    the press assembly passes through the housing and is connected to the circuit board.

3. The electrically-controlled upper handle according to claim 2, wherein the circuit board comprises a connection port, the handle portion is provided with an interface through hole, and the interface through hole is communicated with the connection port.

4. The electrically-controlled upper handle according to claim 2, wherein:
    the housing is provided with a key mounting hole,
    the circuit board comprises a switch start key,
    the press assembly comprises a first elastic member and a key inserted into the key mounting hole, and
    one end of the first elastic member is sleeved into the switch start key, and the other end of the first elastic member passes through the key.

5. The electrically-controlled upper handle according to claim 1, wherein the gasket unit comprises a first gasket, a second gasket and a third gasket, the first gasket, the second gasket and the third gasket are stacked sequentially from top to bottom, the second gasket comprises a gasket body and a plurality of balls, and the balls are arranged in the gasket body along a circumferential direction of the gasket body.

6. The electrically-controlled upper handle according to claim 1, wherein:
    the mounting portion is provided with a limit groove, and the limit groove is configured to limit a data cable when the electrically-controlled upper handle is connected to the imaging device by the data cable.

7. The electrically-controlled upper handle according to claim 6, wherein:
    the handle portion is also provided with at least one threaded hole, and the threaded hole is configured to be externally connected with an imaging accessory.

8. An imaging accessory, comprising the electrically-controlled upper handle according to claim 1.

* * * * *